No. 811,944. PATENTED FEB. 6, 1906.
G. McHENRY.
VEHICLE RUNNING GEAR.
APPLICATION FILED APR. 11, 1905.
2 SHEETS—SHEET 2.
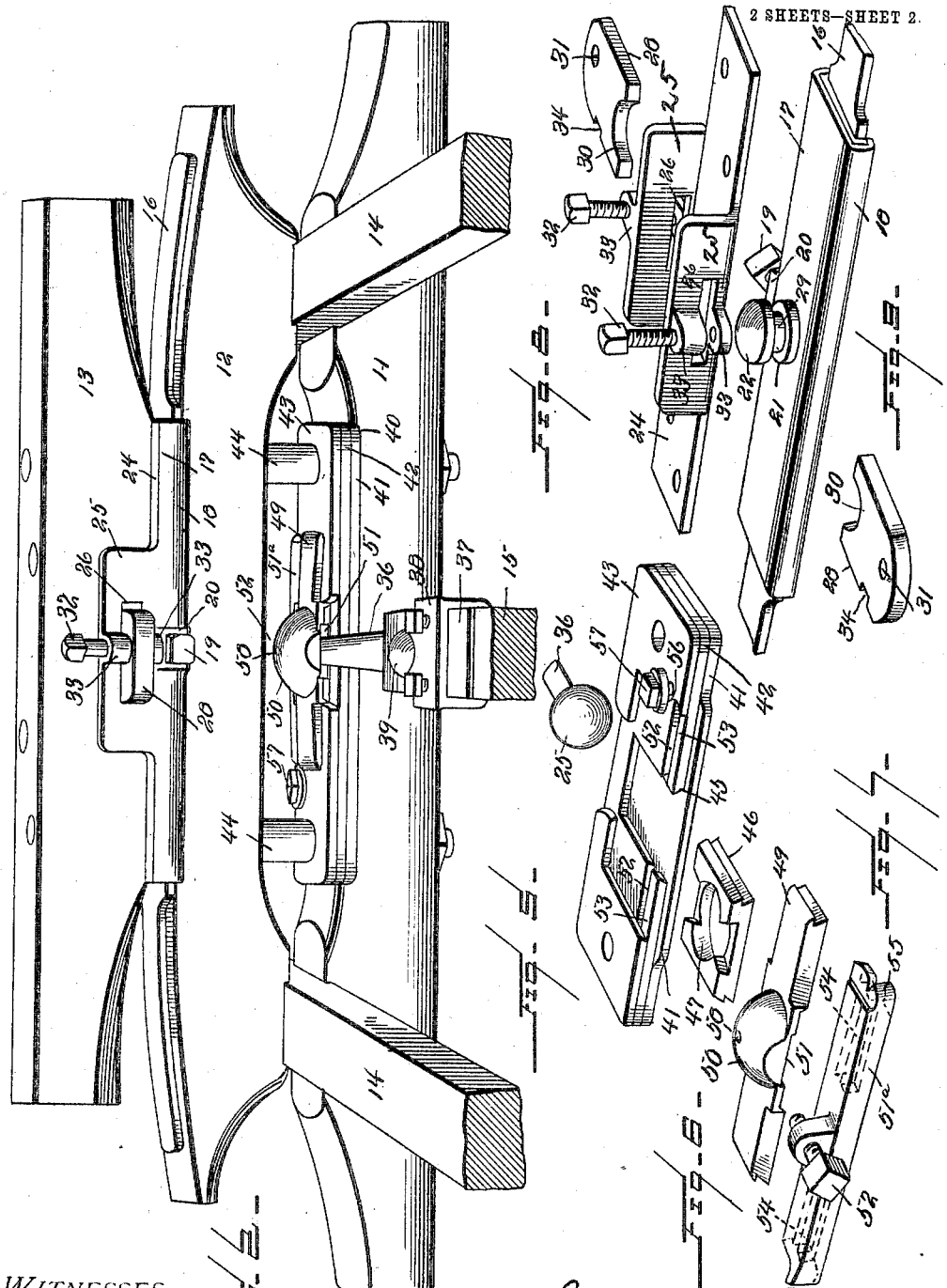
WITNESSES:
F. A. Parron
M. Schmidt
INVENTOR
Grant McHenry
By
Milo B. Stevens & Co. Attorneys

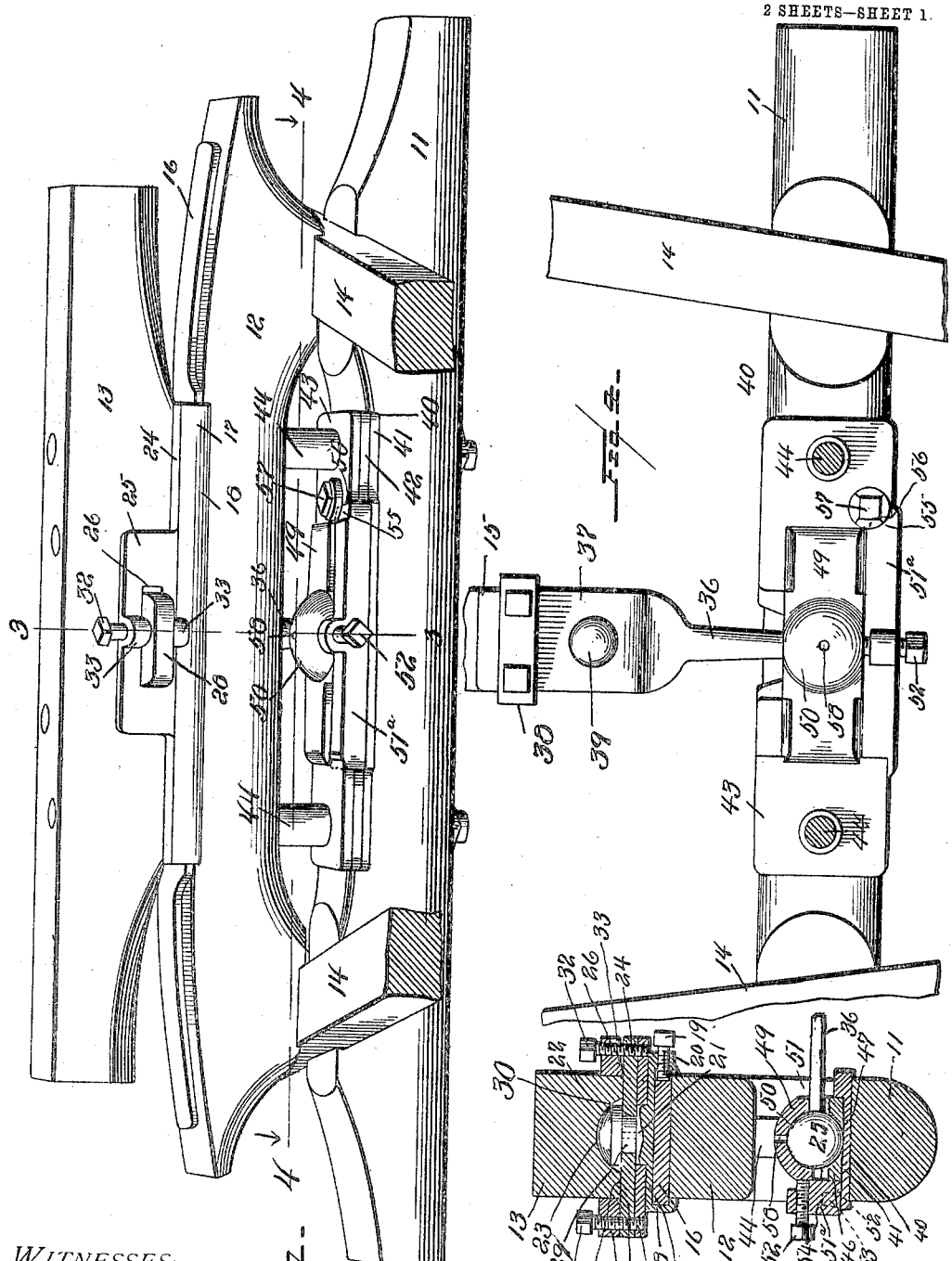

UNITED STATES PATENT OFFICE.

GRANT McHENRY, OF MOUNT LIBERTY, OHIO.

VEHICLE RUNNING-GEAR.

No. 811,944. Specification of Letters Patent. Patented Feb. 6, 1906.

Application filed April 11, 1905. Serial No. 254,964.

*To all whom it may concern:*

Be it known that I, GRANT McHENRY, a citizen of the United States, residing at Mount Liberty, in the county of Knox and State of Ohio, have invented new and useful Improvements in Vehicle Running-Gear, of which the following is a specification.

My invention relates to a vehicle running-gear, and has for its object to provide improved means for pivotally securing the bolster to the sand-board without penetrating either of said parts as when the ordinary king-bolt is used, thereby adding to the strength of the running-gear.

A further object is to provide an improved reach-coupling.

In the accompanying drawings, Figures 1 and 2 are perspective views of the gears from opposite sides. Figs. 3 and 4 are sectional views on the lines 3 3 and 4 4, respectively, of Fig. 1. Figs. 5 to 9 are details.

Referring specifically to the drawings, 11 denotes the axle; 12, the sand-board; 13, the bolster; 14, the hounds, and 15 the reach. On top of the sand-board are two superposed plates 16 and 17, respectively, the former being made fast to the sand-board. The outer edges of the plate 17 are bent downwardly, as at 18, to extend over the edges of the plate 16 and the two plates are fastened together by a set-screw 19, one of the edges 18 having a boss 20, through which the set-screw is threaded and screwed against the plate 16. The plate 17 has a short upwardly-extending stud 21, the head 22 of which fits in a socket 23 in the bolster. On the under side of the bolster a plate 24 is secured, said plate having a hole registering with the socket to enable the stud to enter the same. The plate has on opposite sides upturned flanges 25, fitting on the sides of the bolster and having openings 26, which register with a groove 27, extending across the under side of the bolster. The grooves receive keys 28, engaging the stud, whereby the sand-board and bolster are secured against separation. The stud is formed with a contracted portion or neck 29, which is in alinement with the groove 27 when the parts are assembled and is engaged by the inner ends of the keys, which ends have a semicircular recess 30, in which the neck fits. The outer ends of the keys have openings 31, through which bolts 32 extend, said bolts being threaded through ears 33, extending outwardly from the flanges 25. The keys are also notched on one side, as at 34, in which notches the walls of the openings 26 fit. The stud serves as a pivotal connection between the bolster and the sand-board, and upon inserting the keys and fastening them, as described, the parts will be securely locked together.

The construction herein described is advantageous, for the reason that the bolster and the sand-board are not weakened by boring holes therethrough, as when the ordinary form of king-bolt is used. The plates 17 and 24 being in contact serve as wear-plates and also prevent the bolster from tilting sidewise when the wagon is traveling over rough ground.

The connection between the reach 15 and the axle is by a ball-and-socket joint. The ball 25 is carried at the outer end of the stem 36, which is joined at its opposite end to spaced plates 37, between which the reach extends, the plates being fastened to the latter by a clip 38 and a bolt 39 or any other suitable means.

On top of the axle a recess 40 is made to receive three superposed plates 41, 42, and 43, respectively, said plates being fastened to the axle by the bolts 44, whereby the axle is fastened to the sand-board. These bolts also serve to fasten the plate 16, heretofore described, to the sand-board. The plate 42 is recessed, as at 45, to receive a plate 46, having a socket 47 to receive the ball and fitting on top of the plate 41. The walls of the recess are undercut, as shown, and the ends of the plate 46 are shaped accordingly, so that a dovetail joint is had. A retaining-plate 49 fits on top of the plate 42 and is dovetailed into the plate 43. The retaining-plate is recessed on its under side to fit over the plate 46 and also has a socket 50, in which the ball fits. An opening 51 is made in front through which the stem 36 extends, said opening being made sufficiently wide to permit the stem to work freely. Behind the retaining-plate a block 51ª is placed, through which a set-screw 52 is threaded, which bears on the retaining-plate and is for the purpose of taking up wear. The plate 42 is recessed, as at 52, which form ribs 53, which fit in grooves 54, made in the under side of the block. At one end the block has a projection 55, which fits in a notch 56, made in the plate 43. Adjacent the notch is a threaded aperture into which a bolt 57 is screwed. The head of the bolt bears on the projection 55, whereby the block is securely held in position. The retaining-plate has a small hole 58 on top through which a lubricant may be applied to the ball. The recesses containing the plates 46 and 49 do not extend entirely across the plate, being closed in front to prevent withdrawal of said plates by the ball. The plates are inserted from the front when the parts are assembled.

Having thus described my invention, what is claimed as new, and desired to be secured by Letters Patent, is—

1. In a reach-coupling, the combination with an axle having a socketed plate, of a reach having at its end a ball fitting in the socket, a retaining-plate over the ball, a block secured to the first-mentioned plate, and a set-screw threaded through said block and bearing on the retaining-plate.

2. In a vehicle running-gear, the combination with a bolster having a socket and a transverse groove in its under side, of a sand-board having a projecting headed stud entering the socket, keys extending through the groove and having their inner ends shaped to fit the stud below the head, and means for securing the keys.

3. In a vehicle running-gear, the combination with a bolster having a socket and a transverse groove in its under side, of a plate secured to the bolster and having openings registering with the socket and groove, a sand-board having a projecting stud entering the socket, keys extending through the groove into engagement with the stud, and means carried by the aforesaid plate for securing the keys.

4. In a vehicle running-gear, the combination with a bolster having a socket and a transverse groove in its under side, of a wear-plate secured to the bolster and having openings registering with the socket and groove, a sand-board having a wear-plate provided with a projecting stud entering the socket, keys extending through the groove into engagement with the stud, and means carried by the first-mentioned plate for securing the keys.

In testimony whereof I have signed my name to this specification in the presence of two subscribing witnesses.

GRANT McHENRY.

Witnesses:
CLARENCE D. MASTELLER,
THOMAS BOWIE.